US011298903B2

(12) United States Patent
Derflinger, Sr. et al.

(10) Patent No.: US 11,298,903 B2
(45) Date of Patent: Apr. 12, 2022

(54) DEVICE FOR CONTINUOUSLY PRESSING LIQUID OUT OF A SUSPENSION

(71) Applicants: Franz Derflinger, Sr., Linz (AT); Franz Derflinger, Jr., Pucking (AT)

(72) Inventors: Franz Derflinger, Sr., Linz (AT); Franz Derflinger, Jr., Pucking (AT)

( * ) Notice: Subject to any disclaimer, the term of this patent is extended or adjusted under 35 U.S.C. 154(b) by 166 days.

(21) Appl. No.: 16/464,445

(22) PCT Filed: Oct. 2, 2017

(86) PCT No.: PCT/AT2017/050025
§ 371 (c)(1),
(2) Date: May 28, 2019

(87) PCT Pub. No.: WO2018/098512
PCT Pub. Date: Jun. 7, 2018

(65) Prior Publication Data

US 2019/0375178 A1 Dec. 12, 2019

(30) Foreign Application Priority Data

Nov. 30, 2016 (AT) .............................. A 51087/2016

(51) Int. Cl.
*B30B 9/14* (2006.01)
*B30B 9/12* (2006.01)
(Continued)

(52) U.S. Cl.
CPC ................ *B30B 9/14* (2013.01); *B30B 9/121* (2013.01); *B30B 9/128* (2013.01); *B30B 15/32* (2013.01); *B30B 9/18* (2013.01); *B30B 9/26* (2013.01)

(58) Field of Classification Search
CPC ........... B30B 9/14; B30B 9/121; B30B 9/128; B30B 15/32; B30B 9/18; B30B 9/26;
(Continued)

(56) References Cited

U.S. PATENT DOCUMENTS 1,299,524 A * 4/1919 Wertenbruch .......... B30B 9/128 100/148
1,838,996 A 12/1931 Lang
(Continued)

FOREIGN PATENT DOCUMENTS

AT 412 857 B 8/2005
CN 200973996 Y * 11/2007 ............... B30B 9/14
(Continued)

*Primary Examiner* — Teresa M Ekiert
*Assistant Examiner* — Sarkis A Aktavoukian
(74) *Attorney, Agent, or Firm* — Muirhead and Saturnelli, LLC

(57) ABSTRACT

A device is described for continuously pressing liquid out of a suspension, in particular a screw press, which may have a rotationally-driven rotor, which may rotate in a tubular screw housing and support a conveyor screw. The screw housing may be at least partially formed as a first filter jacket, which may at least partially interact with the conveyor screw and which may have radial passages for discharging the filtered liquid and which may supply a filter cake, made of retained solids, in the conveyance direction of the conveyor screw to a discharge. To provide advantageous filter conditions, a ring-shaped first sleeve, which coaxially encloses the rotor, for peeling off an outer filter cake layer from the filter cake may be associated with the rotor, downstream from the conveyor screw. A conveyance channel for the remaining inner filter cake layer may be provided between sleeve and rotor.

20 Claims, 2 Drawing Sheets

(51) Int. Cl.

| | |
|---|---|
| ***B30B 15/32*** | (2006.01) |
| ***B30B 9/18*** | (2006.01) |
| ***B30B 9/26*** | (2006.01) |

(58) Field of Classification Search
CPC .. B30B 9/12; B30B 9/16; B30B 9/125; B30B 9/122
USPC ........ 100/112; 210/609, 623, 100, 224, 204, 210/230
See application file for complete search history.

(56) References Cited

U.S. PATENT DOCUMENTS

| | | | | |
|---|---|---|---|---|
| 1,851,191 A | | 3/1932 | Lang | |
| 2,930,314 A | | 3/1960 | Carlson | |
| 5,515,776 A | | 5/1996 | Scheucher et al. | |
| 2006/0174781 A1 | * | 8/2006 | Scheucher | B30B 9/18 100/117 |
| 2009/0050580 A1 | * | 2/2009 | Takao | B01D 33/50 210/784 |

FOREIGN PATENT DOCUMENTS

| | | | | | |
|---|---|---|---|---|---|
| DE | 600 28 187 T2 | | 3/2007 | |
| DE | 202015009140 U1 | * | 11/2016 | B01D 29/6476 |
| EP | 0549092 B1 | | 6/1993 | |
| EP | 0 549 092 B1 | | 3/1996 | |
| EP | 1 586439 A1 | | 10/2005 | |
| FR | 2815288 A1 | * | 4/2002 | B30B 9/122 |
| JP | H04 157095 A | | 5/1992 | |
| JP | H04 200899 A | | 7/1992 | |
| JP | H07 266088 A | | 10/1995 | |
| JP | 2002160092 A | * | 6/2002 | B30B 9/121 |
| JP | 2003136291 A | * | 5/2003 | B30B 9/18 |
| WO | WO 93/2323 8 A1 | | 11/1993 | |
| WO | WO-9625289 A1 | * | 8/1996 | B30B 9/18 |
| WO | WO 01/34374 A1 | | 5/2001 | |
| WO | WO-2015064176 A1 | * | 5/2015 | B01D 29/23 |

* cited by examiner

DEVICE FOR CONTINUOUSLY PRESSING LIQUID OUT OF A SUSPENSION

TECHNICAL FIELD

The system described herein relates to a device for continuously pressing liquid out of a suspension, in particular a screw press.

BACKGROUND OF THE INVENTION

A device for continuously pressing liquid out of a suspension, for example, a screw press, may have a rotationally-driven rotor, which rotates in a tubular screw housing and supports a conveyance screw, wherein the screw housing comprises a first filter jacket, which at least partially interacts with the conveyance screw, and which has radial passages for discharging the filtered liquid, and which feeds a filter cake, made of retained solids, in the conveyance direction of the conveyance screw to a discharge, wherein a ring-shaped first sleeve, which coaxially encloses the rotor, for peeling off an outer filter cake layer from the filter cake is associated with the rotor, downstream from the conveyance screw.

Such a device is known from U.S. Pat. No. 1,299,524 A, wherein the filter is downstream in the conveyance direction from the sleeve and is used to increase the dynamic pressure at the filter outlet. Moreover, a second filter, which cannot be cleaned in operation, however, is associated with the rotor.

Such devices, in particular screw presses, are used, for example, in wastewater processing and/or filtration in sewage treatment plants. A flocculant made of a polymer or the like is typically added to the sludge of the sewage treatment plant to cause flocculation of the solids in the sludge, whereby the solid and the liquid phase of the slurry can be separated better. Moreover, it is to be ensured using such screw presses that the sewage sludge obtained only has the smallest possible liquid component. The most effective possible separation between solid and liquid phase is thus to be possible. For example, DE 60028187 T2 discloses such a screw press. Such screw presses concentrate and drain the respective supplied sludge by pressing out and draining. The respective filter sizes are dependent on the sludge used and/or to be dried. Such screw presses can also be used for the other purposes, however, for example, inorganic sludges in industry.

For example, EP 549092 B1 discloses a further known device of this type. This previously known filter for filtering water out of a fluid also comprises, for example, a drum screen and a helical screw, which revolves in the drum screen. The fluid is conveyed in the conveyance direction through the screen jacket, wherein solids are retained by the screen jacket and conveyed further in the conveyance direction, while in contrast liquid, in particular water, is pressed out through the screen jacket. The fluid is pressed out by the compaction of the retained solids in the conveyance direction. After reaching a desired, predetermined residual moisture in the retained solid mass, it is discharged from the screw press.

The previously known presses have the disadvantage in particular that the maximum achievable degree of dehumidification of the retained mass, in particular in larger screw presses, is limited by the technology used, since the thickness of the filter cake limits the maximum achievable degree of dehumidification.

SUMMARY OF THE INVENTION

Described herein is a system including a device for continuously pressing liquid out of a suspension, for example, a screw press (e.g., a larger screw press) that may achieve an improved degree of dehumidification in a pressed-out filter cake. The system described herein may achieve this improvement by providing a conveyance channel for the remaining inner filter cake layer between sleeve and rotor, where the rotor has a second filter for discharging the filtered liquid through the rotor in the region of the conveyance channel.

According to the system described herein, the outer filter cake layer, which is closer to the filter jacket and is thus pressed out better and/or freed of moisture, may be peeled off from the filter cake using the ring-shaped first sleeve and discharged from the device via the discharge. The inner filter cake layer initially may still remain in the device, may be conveyed by being further driven by the pressure of the conveyor screw, and introduced by pressure into the conveyance channel for the remaining inner filter cake layer between first sleeve (and rotor). This inner filter cake layer may be drained further via a second filter provided in this region of this conveyance channel. Liquid withdrawn from the filter cake in this case may be pressed through the second filter into the rotor interior and drained therefrom in the further sequence via a corresponding drain out of the device.

The degree of dehumidification of the filter cake thus may be significantly improved. The inner filter cake layer, which is reduced with respect to its residual moisture in this manner, in turn may be discharged from the device via the discharge in the further sequence.

The second filter also may be cleaned off by the filter cake pressed past it; however, it may be advisable, in order to achieve an improved filter effect, for the first sleeve to be associated with at least one scraper extended toward the rotor for cleaning off the filter cake from the second filter. This scraper may be fastened in this case on the first sleeve in the conveyance channel and may protrude radially from the sleeve toward the second filter. It may be desirable that the scraper is aligned in this case parallel to the axis of the rotor with its scraper blades sliding on the second filter. The cross section of the conveyance channel could possibly also be formed constricted, i.e., conical, in the conveyance direction to increase the conveyance pressure in the conveyance direction for improved pressing out of the liquid.

To advantageously be able to set the counter pressure and/or the peeling behavior of the ring-shaped first sleeve with respect to the filter cake, the first sleeve may be displaceable parallel to the axis of the rotor using a drive.

On the intake side, the first sleeve may have at least one cone, which may ensure a clean cut between inner and outer filter cake layer. Moreover, to be able to advantageously set the counter pressure for the inner filter cake remaining in the conveyance channel for the purpose of setting the degree of drying, a second sleeve may be disposed downstream from the first sleeve. This second sleeve may be displaceable using a drive in the direction of the rotor axis, may have a smaller internal diameter than the internal diameter of the first sleeve, and may enclose the rotor with clearance. This second sleeve may constrict or widen the output gap for the filter cake between first and second sleeve and thus enable a corresponding counter pressure setting. If the second sleeve is equipped in this case on the intake side with a cone lifting off the filter cake radially from the rotor, the remaining filter cake thus also may be lifted off of the second filter and supplied to the discharge.

To be able to advantageously clean the second filter, a washing lance having cleaning nozzles, which are oriented toward the second filter, may be arranged inside the rotor between the second filter and the rotor axis. These washing nozzles may ensure that material located in filter openings or filter boreholes can be lifted off from the filter surface from the inside with counter pressure and advantageously may be scraped off using the scraper.

The second filter may comprise a fine screen, a filter cloth, or a filter made of porous filter materials, such as plastic or ceramic drawn on to a screen support. The corresponding selection may be dependent on the fluid to be filtered.

BRIEF DESCRIPTION OF THE DRAWINGS

The subject matter of the system described herein is illustrated by way of example in the drawings. In the figures.

DESCRIPTION OF VARIOUS EMBODIMENTS

Figure 1:
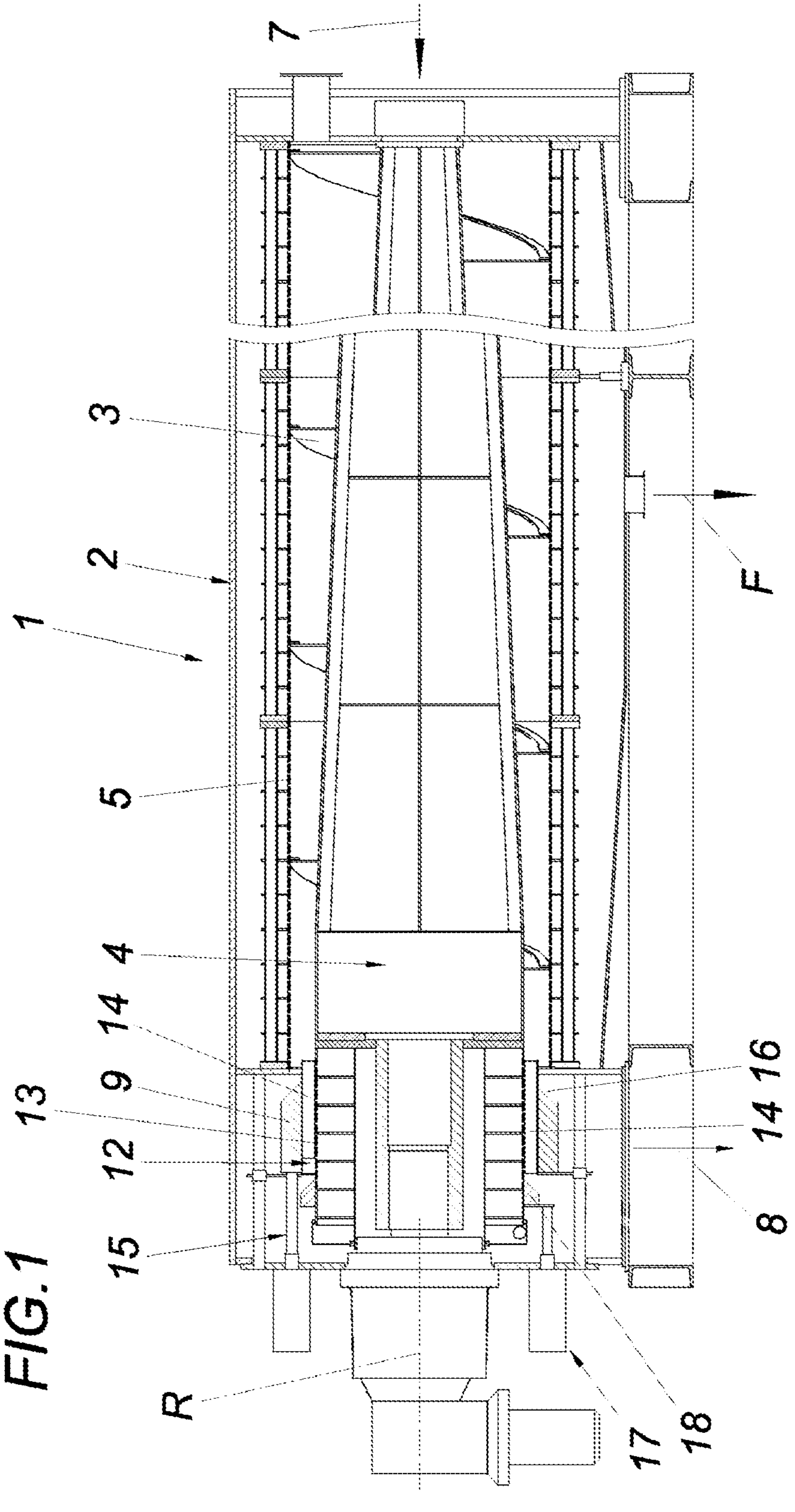
FIG. 1 shows a device according to an embodiment of the system described herein in partially cutaway cross-section.
Figure 2:
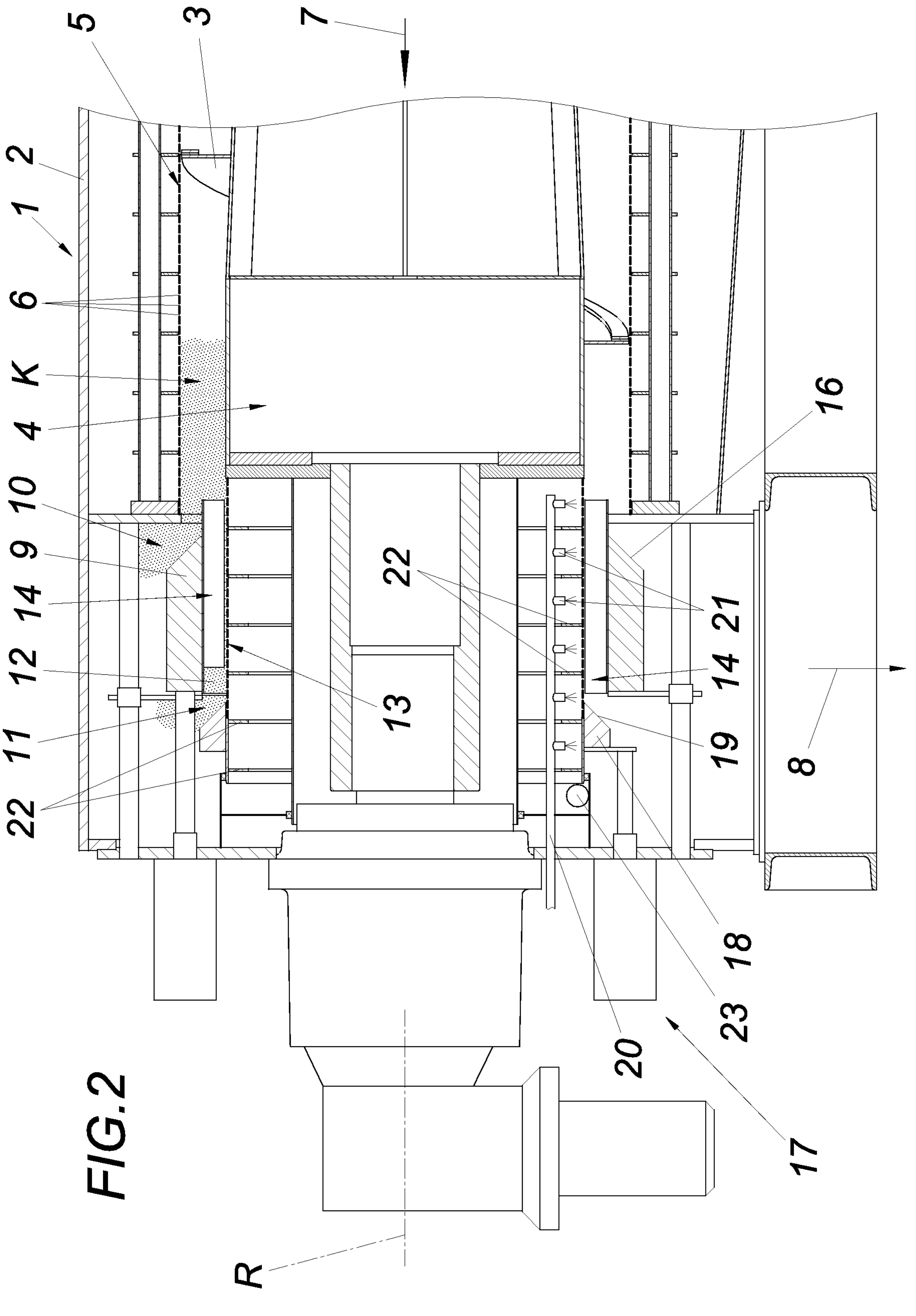
FIG. 2 shows the left section of the device from FIG. 1 in the region of the second filter in an enlarged scale, according to an embodiment of the system described herein.

In some embodiments of the system described herein, a device is provided for continuously pressing liquid out of a suspension, namely a screw press 1, comprises a rotationally-driven rotor 4, which rotates in a tubular screw housing 2 and supports a conveyor screw 3. The screw housing 2 may comprise a first filter jacket 5, which at least partially interacts with the conveyor screw 3 and has radial passages 6 for discharging the filtered liquid and which supplies a filter cake K, made of retained solids, in the conveyance direction 7 of the conveyor screw 3 to a discharge 8.

A fluid to be filtered may be introduced into the space between the conical conveyor screw 3 and the first filter jacket 5 and conveyed by the conveyor screw, which is rotationally driven around the rotor axis R, in the conveyance direction 7 while pressing out the fluid, wherein the solids, which are retained by the first filter jacket 5 and form the filter cake, may be conveyed in the conveyance direction 7 toward the discharge 8, and fluid passing through the passages 6 of the first filter jacket may be discharged from the device via the drain F. Instead of the conical conveyor screw 3, a cylindrical conveyor screw having different pitch could also be used. Combinations thereof are also conceivable. Moreover, the screw can be designed having a single thread or (at least partially) having multiple threads.

According to embodiments of the system described herein, a ring-shaped first sleeve 9, which coaxially encloses the rotor 4, for peeling off an outer filter cake layer 10 from the filter cake K may be associated with the rotor 4, downstream from the conveyor screw 3, wherein a conveyance channel 11 for the inner filter cake layer 12 may be provided between the sleeve 9 and the rotor 4. The rotor 4 may have a second filter 13 for discharging the filtered liquid through the rotor 4 in the region of the conveyance channel 11.

The first sleeve 9 may have at least one scraper 14 extended toward the rotor 4 for cleaning the filter cake 12 off of the second filter 13. In this case, the first sleeve 9 may be displaced parallel to the rotor axis using a drive 15, which may be a hydraulic drive, and may be equipped on the intake side with at least one cone 16.

Moreover, a second sleeve 18 may be disposed downstream from the first sleeve 9. This second sleeve 18 may be displaceable using a drive 17 (which also may be a hydraulic drive) in the direction of the rotor axis R, may have a smaller internal diameter than the internal diameter of the first sleeve 9, may enclose the rotor with clearance, and may have a cone 19 lifting off the filter cake radially from the rotor 4.

In some embodiments, a washing lance 20 having cleaning nozzles 21, which are oriented toward the second filter 13, may be arranged inside the rotor 4, between the second filter 13 and the rotor axis R. The second filter 13 may comprise a fine screen, a filter cloth, or a filter made of porous filter materials, such as plastic or ceramic drawn onto a screen support 22. Liquid discharged through the rotor 4 may be discharged from the device via a discharge 23.

Other embodiments of the invention will be apparent to those skilled in the art from a consideration of the specification and/or an attempt to put into practice the invention disclosed herein. It is intended that the specification and examples be considered as exemplary only, with the true scope and spirit of the invention being indicated by the following claims.

The invention claimed is:

1. A device for continuously pressing liquid out of a suspension, comprising:

a conveyer screw;

a tubular screw housing that includes a first filter that at least partially interacts with the conveyor screw and has radial passages for discharging filtered liquid, the first filter supplying a filter cake including retained solids in a conveyance direction of the conveyor screw to a discharge;

a rotationally-driven rotor that rotates in the tubular screw housing and supports the conveyor screw;

a ring-shaped first sleeve coaxially enclosing the rotor and disposed in the conveyance direction of the conveyor screw, that peels off an outer filter cake layer from the filter cake;

a conveyance channel disposed between the first sleeve and the rotor for an inner filter cake layer that remains after the outer filter cake layer is peeled off, wherein the rotor includes a second filter for discharging the filtered liquid through the rotor in a region of the conveyance channel; and at least one scraper fastened on the first sleeve in the conveyance channel and protruding radially from the first sleeve toward the second filter for cleaning a portion of the filter cake off of the second filter.

2. The device according to claim 1, wherein the first sleeve is displaceable parallel to an axis of rotation of the rotor using a drive.

3. The device according to claim 1, wherein the first sleeve has at least one cone on an intake side of the first sleeve.

4. The device according to claim 1, further comprising:

a washing lance having cleaning nozzles oriented toward the second filter, the washing lance arranged inside the rotor between the second filter and an axis of the rotor.

5. The device according to claim 1, wherein the second filter includes a fine screen, a filter cloth, or a filter made of porous filter materials.

6. The device according to claim 5, wherein the porous filter materials include plastics or ceramics drawn onto a screen support.

7. The device of claim 1, wherein the device comprises a screw press.

8. The device according to claim 1, further comprising:

a second sleeve disposed in the conveyance direction from the first sleeve, wherein the second sleeve is displaceable using a drive in a direction of an axis of the rotor, has a smaller internal diameter than an internal diameter of the first sleeve, and encloses the rotor with a clearance.

9. The device according to claim 8, wherein the second sleeve has a cone which lifts the filter cake radially off of the rotor on an intake side of the second sleeve.

10. The device according to claim 8, wherein the first sleeve and the second sleeve are displaceable parallel to the axis of the rotor.

11. A device for continuously pressing liquid out of a suspension, comprising:

a conveyer screw;

a tubular screw housing that includes a first filter that at least partially interacts with the conveyor screw and has radial passages for discharging filtered liquid, the first filter supplying a filter cake including retained solids in a conveyance direction of the conveyor screw to a discharge;

a rotationally-driven rotor that rotates in the tubular screw housing and supports the conveyor screw;

a ring-shaped first sleeve coaxially enclosing the rotor and disposed in the conveyance direction of the conveyor screw, that peels off an outer filter cake layer from the filter cake;

a conveyance channel disposed between the first sleeve and the rotor for an inner filter cake layer that remains after the outer filter cake layer is peeled off, wherein the rotor includes a second filter for discharging the filtered liquid through the rotor in a region of the conveyance channel; and a second sleeve disposed in the conveyance direction from the first sleeve, wherein the second sleeve is displaceable using a drive in a direction of an axis of the rotor, has a smaller internal diameter than an internal diameter of the first sleeve, and encloses the rotor with a clearance.

12. The device according to claim 11, wherein the second sleeve has a cone which lifts the filter cake radially off of the rotor on an intake side of the second sleeve.

13. The device according to claim 11, wherein the first sleeve and the second sleeve are displaceable parallel to the axis of the rotor.

14. The device according to claim 11, further comprising:

at least one scraper extended toward the rotor for cleaning a portion of the filter cake off of the second filter.

15. The device according to claim 11, wherein the first sleeve is displaceable parallel to the axis of the rotor.

16. The device according to claim 11, wherein the first sleeve has at least one cone on an intake side of the first sleeve.

17. The device according to claim 11, further comprising: a washing lance having cleaning nozzles oriented toward the second filter, the washing lance arranged inside the rotor between the second filter and the axis of the rotor.

18. The device according to claim 11, wherein the second filter includes a fine screen, a filter cloth, or a filter made of porous filter materials.

19. The device according to claim 18, wherein the porous filter materials include plastics or ceramics drawn onto a screen support.

20. The device of claim 11, wherein the device comprises a screw press.

* * * * *